INVENTOR
Hans COLELL
BY Dicke & Craig
ATTORNEYS

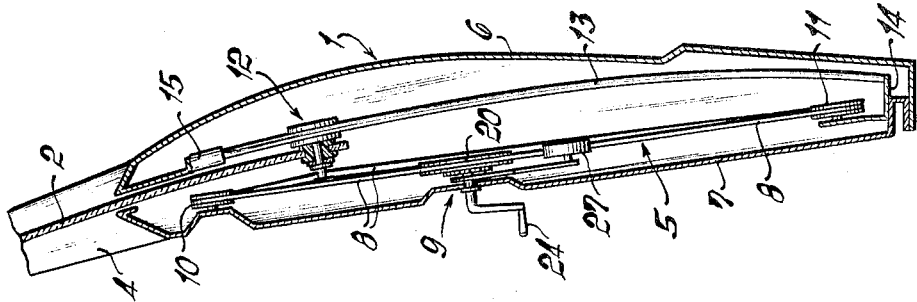
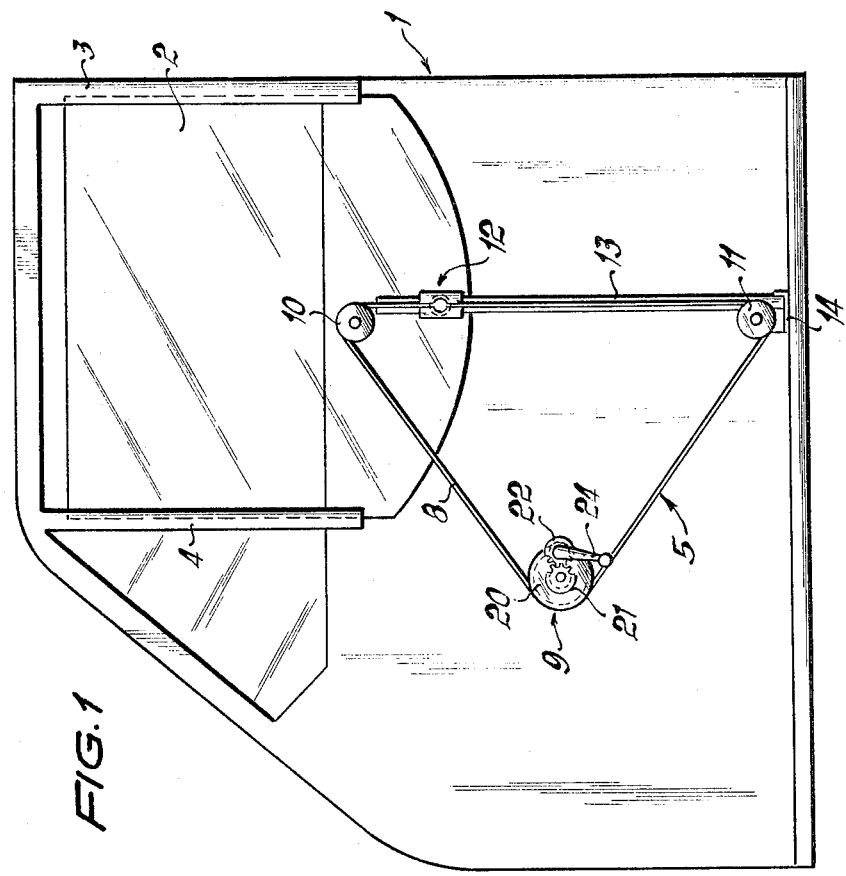

Nov. 1, 1966 H. COLELL 3,281,991
OPERATING MECHANISM FOR RETRACTABLE VEHICLE WINDOWS
Filed Oct. 20, 1964 3 Sheets-Sheet 3

INVENTOR
Hans COLELL
BY Dicke & Craig
ATTORNEYS

United States Patent Office 3,281,991
Patented Nov. 1, 1966

3,281,991
OPERATING MECHANISM FOR RETRACTABLE VEHICLE WINDOWS
Hans Colell, Schwieberdingen Kreis Ludwigsburg, Germany, assignor to Firma Dr. Ing. h.c. F. Porsche K.G., Stuttgart-Zuffenhausen, Germany
Filed Oct. 20, 1964, Ser. No. 405,192
Claims priority, application Germany, Nov. 27, 1963, P 33,074
6 Claims. (Cl. 49—352)

The present invention relates to an operating mechanism for retractable windows, particularly side windows for motor vehicles, including a tension cable drive, whereby the tension member connected with the window is in the form of a closed loop guided on rollers and driven in a postive manner without slippage over the full extent of its adjustment.

Operating mechanisms for retractable vehicle windows are known in which a lift arm is operated to adjust the position of the window through a pinion and segment. Window lifters constructed according to this principle include a great number of machine stampings so that the mechanism becomes extremely heavy and complicated. The assembly of the mechanism must be accomplished accurately so as to be easily movable, and long guides which extend essentially over the entire range of adjustment are required for guiding the window. This is especially necessary since, with this construction, the window lifter is simply not sufficient to provide an effective guide for all positions of the window.

It is also known to operate the window by means of a cable. With this construction, it is necessary to wind the cable on the drive cylinder by friction using a large number of turns so that correspondingly wide structural members and sufficient space therefore must be provided in the door. Both constructions require continuous attention in order to protect the structural members from water entering through the window gap in the vehicle door.

These disadvantages are eliminated according to the instant invention by providing a tension member which is constructed as a continuous toothed belt guided and supported by means of one or a number of guide rollers. By this means, the mechanism may be held to small dimensions so that the space requirement in the door is held to a minimum; the width of the door may therefore be decreased as compared with the dimensions required by known constructions. The flexible toothed belt will also equalize possible small tolerances in the assembly without having disadvantageous reactions on the ease of movement of the window, and will not require the degree of attention and maintenance of prior art constructions. With the exception of the drive roller, the support connection with the toothed belt is constructed as a gear wheel whereby the slippage is held to a minimum. In addition, it is not necessary with the invention to maintain a certain distance between the guide rollers based on the toothed pitch of the drive mechanism in order to insure a certain degree of tension in the belt since the toothed belt may advantageously be held under tension by means of a tension roller. Lost motion is thereby prevented.

In accordance with the invention, the gear wheel is arranged on a shaft which serves as the rotating shaft for a bell crank that carries the tension roller. The shaft is fastened to a plate which is provided, at the same time, with an adjustable mounting member for the tension roller. For easy adjustment of the tension roller, the mounting support member includes a segment member which cooperates with a clamping screw held in the plate. The segment member is provided with a knurled edge in the range of action whereby additional construction members for securing the tension roller; that is, preventing its mounting support from sliding off, are not required.

The toothed belt is connected with the window by means of a bolt construction which is provided with a lock for mounting of the toothed belt. The bolt construction is thereby mounted for universal movement on the window, which construction prevents initial tensioning and binding of the window through provision of a flexible window support. The guidance of the bolt construction is accomplished by means of a column support. A sleeve is slideably mounted on the column and is connected with the bolt construction so as to provide the connection between window and window lifter. The sleeve acts in cooperation with the guiding column and insertion of guide members made of synthetic material insures free sliding on the column in spite of adverse weather. In order to substantially avoid jamming of the window and to assure free movement thereof over the entire range of adjustment, the lateral guides of the window are made in general essentially of a length corresponding to the height of the window.

Accordingly, it is an object of the instant invention to provide an operating mechanism for retractable vehicle windows which generally avoids many, if not all, of the disadvantages inherent in prior art mechanism, and substantially completely eliminates the disadvantages noted hereinabove.

It is another object of the instant invention to provide an operating mechanism for retractable vehicle windows which is light weight and mechanically simple in construction so as to provide effective operation with moderate tolerance requirements.

It is a further object of the instant invention to provide an operating mechanism for retractable vehicle windows which makes possible a reduction in the thickness of the vehicle door as compared to dimensions required by known constructions.

It is still another object of the instant invention to provide an operating mechanism for retractable vehicle windows which provides accurate guidance for all positions of said window with guidance means considerably smaller than known arrangements.

It is a further object of the instant invention to provide an operating mechanism for retractable vehicle windows having positive drive means free from slippage and lost motion.

It is still a further object of the instant invention to provide an operating mechanism for retractable vehicle windows which is capable of adjustment to insure continuous optimum operation.

These and other objects, features, and advantages of the present invention will become more obvious from the following description when taken in connection with the accompanying drawing which shows, for purposes of illustration only, various embodiments in accordance with the present invention, and wherein:

FIGURE 1 is a plan view of a door construction for a motor vehicle provided with a retractable window which is operated by the mechanism of the invention;

FIGURE 2 is a vertical cross section through the door construction according to FIGURE 1;

Figure 3:
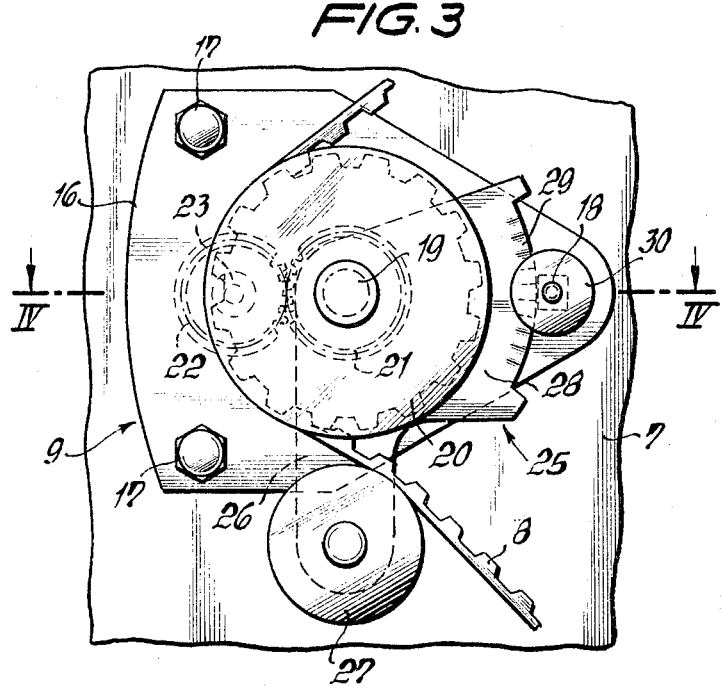
FIGURE 3 is a detail view of the driving mechanism of the invention.

Referring now to the drawings wherein like reference numerals are used throughout the various views to designate corresponding parts and more particularly to FIGURES 1 and 2, reference numeral 1 designates a vehicle door of standard construction which includes a standard retractable window 2 supported in vertical guides 3 and 4 for movement between open, closed, and intermediate positions. The window 2 is movable perpendicularly in the plane of the door by means of a mechanism 5 which forms the instant invention. The door 1 is formed of an outer profile 6 and an inner profile 7 joined in any conventional manner, such as riveting, bolting, welding, or the like.

The mechanism 5 for operating: that is, moving, the window 2 consists of a toothed belt 8 which is guided and driven by a drive member 9 and supported by rollers 10 and 11. The toothed belt is connected with the window pane by means of a mounting 12, the window pane being guided on the inside of the door on a column 13 fastened to the door by means of brackets 14 and 15.

Figure 4:
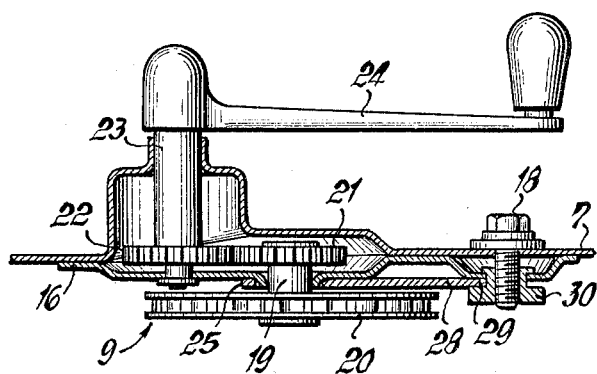
FIGURE 4 is a cross section along line IV—IV of FIGURE 3.

The drive member 9 (FIGURES 3 and 4) includes a support plate 16 which is held on the inner profile 7 of the door 1 by screws 17 and 18. A gear wheel 20 is fastened to a shaft 19 supported in the support plate 16. Through gearing 21, 22, shaft 19 is operatively connected with shaft 23, which, in turn, is connected with a crank 24. During operation of the crank 24, the gear wheel 20 is moved or driven.

The drive member 9 further includes an angle or bell crank 25 formed of sheet metal which is arranged coaxially with shaft 19. Arm 26 of the bell crank 25 carries a roller 27 and the other arm 28 of the bell crank extends with its edge 29 under a nut 30 which cooperates with screw 18. Edge 29 of the bell crank arm 28 is knurled or similarly machined to provide a frictional surface capable of being maintained in place without slippage.

Roller 27 serves as a tension roller for the toothed belt 8. By loosening screw 18, the bell crank can be rotated and may be brought into the desired position. When a sufficient tension of the toothed belt 8 has been attained, arm 28 is held in position by tightening screw 18.

Figure 5:
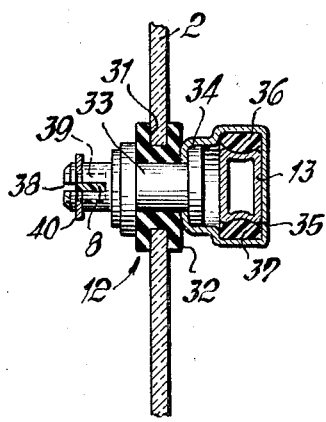
FIGURE 5 is a detail horizontal cross section through the mounting support of the window.

The connection of the toothed belt 8 with the window 2 by means of mounting 12 is shown in FIGURE 5. Window 2 is provided with an opening 31 into which an elastic sleeve 32, for example, rubber, is inserted. A pin 33 extends through sleeve 32 and is provided at one end thereof with a flat head 34. By means of head 34 on the pin 33, a housing 35 is secured to pin 33. Housing 35 is supported on the column 13 through sliding member terial.

The other end of pin 33 opposite the housing is provided with a slot 38, the width of which corresponds essentially to the size of the toothed belt in the region of the tooth gap. Pin 33 is further provided with a bore 39, the radius of which corresponds approximately to the thickness of the toothed belt in the region of the tooth. For connecting pin 33 with the toothed belt 8, the belt is brought into slot 38 in such a manner that one tooth of the toothed belt is positioned in bore 19. By means of a locking lever 40, the belt is thereafter securd against sliding out, In order, among other things, to prevent as much as possible the danger of cocking of the window, the guide means 3 and 4 are made slightly longer than the window opening. This means that the window below the window opening, that is, inside the door, is guided in the main by the guide column 13 whereby, for example, unequally extending long guides are avoided.

Figure 6:
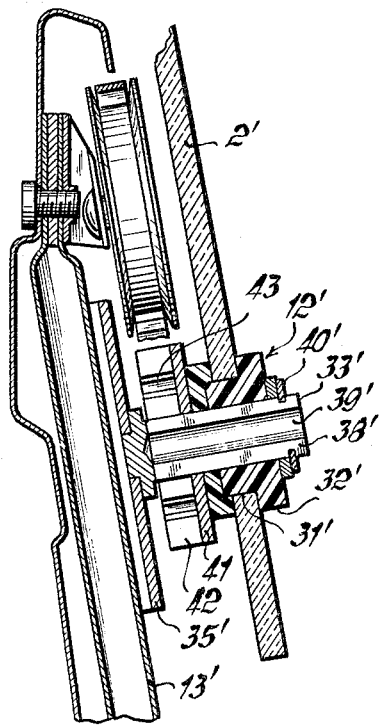
FIGURE 6 is a detail view of another embodiment of a driving mechanism in accordance with the instant invention.
Figure 7:
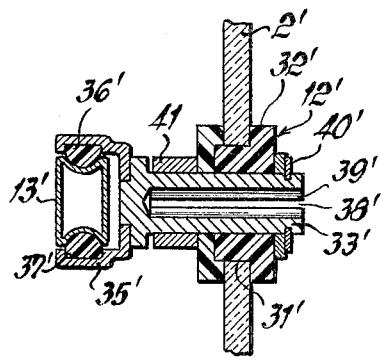
FIGURE 7 is a detail horizontal cross section through a mounting support in accordance with the embodiment of FIGURE 6.

Another possible construction of a mounting for the connection of the window with the toothed belt is shown in FIGURES 6 and 7. The difference between this embodiment and the embodiment described above lies in the position of the toothed belt on the mounting relative to the window and the guide column. In the first case, the toothed belt is arranged at the free end of the pin, whereas the toothed belt according to FIGURES 6 and 7 extends between the window and the window guide column.

Mounting 12' of the window 2' according to FIGURES 6 and 7 includes essentially the same elements as does mounting 12 of the embodiment previously described. It consists of a pin 33' on which is arranged an elastic sleeve 32' which is held in an opening 31' of the window 2'. At one end of pin 33' a housing 35' is fastened thereto which cooperates with a guide column 13' by means of slide members 33' and 37' made preferably of synthetic material.

The fastening of the toothed belt at pin 33' is accomplished between guide shaft 13' and the window 2' or housing 35' and the elastic sleeve 32', respectively. For this purpose, the pin 33' is provided with a slot 38', the width of which corresponds essentially to the thickness of the toothed belt in the region of the tooth gap. The pin is further provided with a bore 39', the diameter of which is so large as to receive one tooth.

For connecting the toothed belt with the pin 33', the toothed belt is inserted into the slot 38' in such a manner that one tooth of the belt lies in the bore 39'. The toothed belt is thereby secured radially in the pin. Subsequently, sleeve 32' together with window 2' is pushed onto the pin and is held in an axial direction by a lock 40'.

If, for example, large and heavy windows must be removed, it may be advantageous to provide a lighter connection between the toothed belt and the pin. For this purpose, a guide member 41 is provided which is supported on pin 33'. The guide member is provided with a longitudinal groove 42, the depth of which corresponds approximately to the width of the toothed belt. A number of tooth-like depressions 43 are preferably cut into a wall adjacent the longitudinal groove. The distance of the depressions from one another is selected such that with a toothed belt inserted into slot 38 and with one tooth engaging the bore 39, the adjacent teeth will fall into the depressions. During assembly, the guide member 41 is aligned such that the longitudinal slot or groove is in one plane with slot 38' and pin 33. Thereby, during insertion of the toothed belt into the mounting, a connection between pin and toothed belt is obtained by a number of teeth of the toothed belt so that the loading of the individual teeth of the toothed belt is small.

While I have shown and described several embodiments in accordance with the present invention, it is understood that the same is not limited thereto but is susceptible of numerous changes and modifications as known to a person skilled in the art; and I, therefore, do not wish to be limited to the details shown and described herein, but intend to cover all such changes and modifications as are encompassed by the scope of the appended claims.

I claim:

1. Operating mechanism for retractable windows of vehicles, particularly side windows of motor vehicles, comprising a window, means for guiding said window during sliding movement between first, second and intermediate positions, and driving means for said window including a flexible toothed belt operatively connected to said window and supported in closed circuit arrangement by a drive wheel and at least one guide roller, said drive wheel being mounted for rotation on a shaft serving simultaneously as an axle of rotation for a bell crank, and tension roller means supported on one end of said bell crank in contact with said toothed belt for adjustably maintaining the tension in said belt at a preselected value, adjustable mounting means associated with the other end of said bell crank for selectively securing said bell crank at various angular positions representative of different amounts of tension in said toothed belt, said ajustable mounting means including a segment portion on said bell crank and a clamping member cooperating with said segment portion to adjustably secure said tension roller means in contact with said toothed belt.

2. Operating mechanism for retractable windows of vehicles, according to claim 1, further comprising, bolt means operatively connecting said flexible tension member to said window, and means for locking said bolt means to said tension member to insure coordinate movement of said window in response to driving of said tension member,
   said bolt means being mounted elastically in the center of said window adjacent one edge thereof.

3. Operating mechanism for retractable windows of vehicles, according to claim 1, further comprising bolt means operatively connecting said flexible tension member to said window, and means for locking said bolt means to said tension member to insure coordinate movement of said window in response to driving of said tension member,
   said bolt means being mounted elastically in the center of said window adjacent one edge thereof,
   guide column means for guiding said bolt means during sliding of said window between first, second and intermediate positions, said bolt means including sleeve means in sliding contact with said guide column means along substantially the entire length thereof.

4. Operating mechanism for retractable windows of vehicles, according to claim 1, further comprising, bolt means operatively connecting said flexible tension member to said window, and means for locking said bolt means to said tension member to insure coordinate movement of said window in response to driving of said tension member,
   said bolt means being mounted elastically in the center of said window adjacent one edge thereof,
   guide column means for guiding said bolt means during sliding of said window between first, second, and intermediate positions, said bolt means including sleeve means in sliding contact with said guide column means along substantially the entire length thereof,
   said sleeve means having slide members of a plastic material in contact with said guide column means to insure adjustability of said bolt means on said guide column means.

5. Operating mechanism for retractable windows of vehicles, according to claim 1, further comprising, bolt means operatively connecting said flexible tension member to said window, and means for locking said bolt means to said tension member to insure coordinate movement of said window in response to driving of said tension member,
   said bolt means being mounted elastically in the center of said window adjacent one edge thereof,
   guide column means for guiding said bolt means during sliding of said window betwen first, second, and intermediate positions said bolt means including sleeve means in sliding contact with said guide column means along substantially the entire length thereof,
   said sleeve means having slide members of a plastic material in contact with said guide column means to insure adjustability of said bolt means on said guide column means,
   said window being located on said bolt means between said sleeve means and said flexible tension member.

6. Operating mechanism for retractable windows of vehicles, particularly side windows of motor vehicles, comprising a window, means for guiding said window during sliding movement between first, second and intermediate positions, and driving means for said windows including a flexible toothed belt operatively connected to said window and supported in closed circuit arrangement by a drive wheel and at least one guide roller, said drive wheel being mounted for rotation on a shaft serving simultaneously as an axle of rotation for a bell crank, and tension roller means supported on one end of said bell crank in contact with said toothed belt for adjustably maintaining the tension in said belt at a preselected value,
   adjustable mounting means associated with the other end of said bell crank for selectively securing said bell crank at various angular positions representative of different amounts of tension in said toothed belt,
   said adjustable mounting means including a segment portion on said bell crank and a clamping member cooperating with said segment portion to adjustably secure said tension roller means in contact with said toothed belt,
   said segment portion being provided with a friction surface in contact with said clamping member over the entire active range of adjustment of said bell crank.

References Cited by the Examiner

UNITED STATES PATENTS 1,606,712   11/1926   McArthur _____ 268—129
2,228,777   1/1941   Nicholson.

FOREIGN PATENTS 533,983   10/1955   Italy.
361,988   6/1962   Switzerland.

HARRISON R. MOSELEY, *Primary Examiner.*

J. K. BELL, *Assistant Examiner.*